United States Patent
Yao et al.

(10) Patent No.: US 9,929,801 B2
(45) Date of Patent: Mar. 27, 2018

(54) CHROMATIC DISPERSION MEASUREMENT METHOD AND DEVICE AND DIGITAL COHERENT RECEIVER

(71) Applicant: ZHONGXING MICROELECTRONICS TECHNOLOGY CO. LTD, Guangdong (CN)

(72) Inventors: Yangzhong Yao, Guangdong (CN); Yunpeng Li, Guangdong (CN); Yi Cai, Guangdong (CN); Weiqin Zhou, Guangdong (CN); Zhensheng Jia, Guangdong (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/112,044

(22) PCT Filed: Apr. 1, 2014

(86) PCT No.: PCT/CN2014/074567
§ 371 (c)(1),
(2) Date: Jul. 15, 2016

(87) PCT Pub. No.: WO2015/106494
PCT Pub. Date: Jul. 23, 2015

(65) Prior Publication Data
US 2016/0329960 A1  Nov. 10, 2016

(30) Foreign Application Priority Data
Jan. 15, 2014 (CN) .......................... 2014 1 0018420

(51) Int. Cl.
*H04B 10/08* (2006.01)
*G06F 17/10* (2006.01)
(Continued)

(52) U.S. Cl.
CPC ....... *H04B 10/07951* (2013.01); *H04B 10/61* (2013.01)

(58) Field of Classification Search
CPC ......................... H04B 10/61; H04B 10/07951
(Continued)

(56) References Cited

U.S. PATENT DOCUMENTS

2010/0142946 A1* 6/2010 Liu .................. H04B 10/25133
398/29
2012/0096061 A1* 4/2012 Hauske ............. H04B 10/2507
708/319

(Continued)

FOREIGN PATENT DOCUMENTS

CN 101753217 A 6/2010
CN 102439879 A 5/2012
(Continued)

OTHER PUBLICATIONS

Malouin, C., et al. "Efficient, Non-Data-Aided Chromatic Dispersion Estimation via Generalized, FFT-Based Sweep" 4 pages, Technical Digest (2013).
(Continued)

*Primary Examiner* — Commen Jacob
(74) *Attorney, Agent, or Firm* — Scully, Scott, Murphy & Presser, P.C.

(57) ABSTRACT

A chromatic dispersion measurement method is provided. According to the method, chromatic dispersion sequence processing is performed on acquired frequency domain data to obtain chromatic dispersion sequences of frequency domain data. A correlation operation on the obtained chromatic dispersion sequences is separately performed at a preset interval. A sum of obtained correlation values is calculated to obtain a first value. A chromatic dispersion value is determined according to the first value, a frequency
(Continued)

value per unit frequency interval of the frequency domain data and the preset interval. In this way, the chromatic dispersion value can be accurately determined, and the processing efficiency is high.

18 Claims, 6 Drawing Sheets

(51) Int. Cl.
  *H04B 1/06* (2006.01)
  *H04B 10/079* (2013.01)
  *H04B 10/61* (2013.01)

(58) Field of Classification Search
  USPC .................................................. 398/25, 9, 1
  See application file for complete search history.

(56) References Cited

U.S. PATENT DOCUMENTS

| | | | | |
|---|---|---|---|---|
| 2012/0177156 A1* | 7/2012 | Hauske | ................ | H04B 10/614 375/343 |
| 2012/0185523 A1* | 7/2012 | Hauske | ............ | H04B 10/25133 708/300 |
| 2012/0213512 A1* | 8/2012 | Stojanovic | ....... | H04B 10/07951 398/29 |
| 2012/0219302 A1* | 8/2012 | Sun | .................... | H04B 10/6161 398/208 |
| 2016/0269108 A1* | 9/2016 | Yao | .................. | H04B 10/07951 |
| 2016/0329960 A1* | 11/2016 | Yao | ........................ | H04B 10/61 |

FOREIGN PATENT DOCUMENTS

| | | |
|---|---|---|
| CN | 102511136 A | 6/2012 |
| JP | 8-335912 A | 12/1996 |
| JP | 2010-130698 A | 6/2010 |
| WO | WO 2009/060526 A1 | 5/2009 |
| WO | 2011/106936 A1 | 9/2011 |
| WO | WO 2012/058484 A1 | 5/2012 |

OTHER PUBLICATIONS

Soriano, R. A., et al. "Chromatic Dispersion Estimation in Digital Coherent Receivers" Journal of Lightwave Technology 29(11):1627-1637 (2011).

Sui, Q., et al. "Fast and Robust Chromatic Dispersion Estimation Using Auto-Correlation of Signal Power Waveform for DSP based-Coherent Systems" 4 pages, Technical Digest (2012).

Supplementary European Search Report dated Aug. 2, 2017 issued in European Patent Application No. 14 87 8650.

* cited by examiner

CHROMATIC DISPERSION MEASUREMENT METHOD AND DEVICE AND DIGITAL COHERENT RECEIVER

CROSS-REFERENCE TO RELATED APPLICATION

This application is a 371 application of PCT Application No. PCT/CN2014/074567, filed Apr. 1, 2014, which is based upon and claims priority to Chinese Patent Application No. 201410018420.2, filed Jan. 15, 2014, the entire contents of which are incorporated herein by reference.

TECHNICAL FIELD

The present disclosure relates to optical communication technologies, and more particularly, to a chromatic dispersion measurement method and device and a digital coherent receiver.

BACKGROUND

With the increase of Internet traffic, an optical communication system in a trunk feeder system needs larger capacity. Meanwhile, as a bit rate per wavelength increases, degradation of information quality may become very severe due to chromatic dispersion, polarization mode dispersion, and various nonlinear waveform distortion on a transmission path.

Compared with incoherent technology, digital coherent receiving technology has the following advantages. An optical signal to noise ratio (OSNR) gain of about 3 dB can be achieved; channel variance can be dealt with and cost can be reduced by conveniently using electronic equilibrium technology; transmission capacity can be improved by using more efficient modulation technology and polarization multiplexing technology. Herein, linear distortion of optical signal, for example, chromatic dispersion (CD), polarization mode dispersion (PMD) and the like, can be almost completely compensated by using the electronic equilibrium technology. Therefore, the digital coherent technology is regarded as a key technology in a high-speed optical communication system.

FIG. 1 is a block diagram illustrating signal processing of a typical digital coherent receiver. As shown in FIG. 1, a procedure for performing signal process by the digital coherent receiver includes: an optical signal is divided into two mutually orthogonal polarized optical signals by a polarizing beam splitter (PBS) 101; the polarized optical signals outputted by the PBS 101 is frequency mixed with a local oscillator optical signal via a 90° photomixer 102; the frequency-mixed optical signal is converted to a baseband electric signal through a balanced photodetector (PD) 103; and the photo-electrically converted electric signal is converted to a digital signal by an analog-to-digital converter (ADC) 104, and then the digital signal converted by the ADC may be processed by means of a universal digital signal process technology.

The digital signal converted by the ADC may be processed using the universal digital signal process technology through following steps in sequence: a skew compensation module 105 performs skew compensation process, a DC (direct current) removing/IQ (In-phase/Quadrature) mismatch compensation module 106 performs DC removing/IQ mismatch compensation process, a chromatic dispersion compensation module 107 performs chromatic dispersion compensation process, a clock recovery module 108 performs clock recovery process, an adaptive equalization module 109 performs adaptive equalization process, a carrier synchronization module 110 performs carrier synchronization process, and a judgment detection module 111 performs judgment detection process.

A chromatic dispersion value generally is relatively large, thus compensation of chromatic dispersion and polarization mode dispersion generally is completed in two parts. First of all, the chromatic dispersion is compensated, an equalizer here generally is unable to use a standard adaptive algorithm for coefficient updating. For example, in order to compensate 40000 ps/nm chromatic dispersion, the number of taps of a filter needs to reach several hundreds or even above one thousand. Generally Fast Fourier Transform is used for fast frequency domain convolution, and a chromatic dispersion estimation module provides the chromatic dispersion compensation module 107 with a chromatic dispersion value to be compensated.

Then, residual compensation of chromatic dispersion and polarization mode dispersion is implemented by the adaptive equalization module 109, specifically, by a finite impulse response (FIR) butterfly equalizer. An FIR butterfly filter adopts an adaptive algorithm to update a coefficient so as to track and compensate the polarization mode dispersion dynamically changing with time. A function of the FIR butterfly equalizer is to implement polarization demultiplexing. The FIR butterfly equalizer plays a role in equalization, matched filtering and sampling position adjustment. When a variation range of a sampling position is too large, or a sampling frequency offset exists so that a sampling phase variation range is beyond an adjustment range of the FIR butterfly adaptive equalizer, the FIR butterfly adaptive equalizer may be unable to work properly. Therefore, a clock recovery module 108 needs to be placed prior to the FIR butterfly equalizer.

The clock recovery module 108 estimates a sampling time error of an input symbol, and performs interpolation adjustment on the sampling time of the symbol, or adjusts an ADC sampling frequency through a voltage-controlled oscillator (VCO) to ensure supply of a stable symbol sampling phase. When the interpolation adjustment is performed on the sampling time of the symbol or the ADC sampling frequency is adjusted through the VCO, it is required that a phase discriminator of the clock recovery module 108 should tolerate signal distortion to a certain degree. A conventional phase discriminator, however, generally can only tolerate a very small chromatic dispersion value. Therefore, it is required that the chromatic dispersion compensation module 107 should accurately perform chromatic dispersion compensation. For this purpose, the chromatic dispersion estimation module needs to provide an accurate chromatic dispersion value to be compensated, in other words, the chromatic dispersion value to be compensated needs to be measured at a high precision.

At present, there is no technical scheme which can measure a chromatic dispersion value to be compensated at a high precision.

SUMMARY

In order to solve existing technical problems, embodiments of the present disclosure provide a chromatic dispersion measurement method and device and a digital coherent receiver.

The embodiments of the present disclosure provide a chromatic dispersion measurement method, including:

performing chromatic dispersion sequence process on acquired frequency domain data to obtain chromatic dispersion sequences of the frequency domain data;

performing correlation operation process with a preset interval on the obtained chromatic dispersion sequences, respectively, and calculating a sum of obtained correlation values to obtain a first value; and determining a chromatic dispersion value according to the first value, a frequency value per unit frequency interval of the frequency domain data and the preset interval.

In the above solution, the performing chromatic dispersion sequence process includes:

multiplying a complex conjugate of an element in the frequency domain data by that of another element which is away from the previous element by a first distance, where the first distance is a system symbol rate.

In the above solution, the performing correlation operation process with the preset interval on the obtained chromatic dispersion sequences of the frequency domain data includes:

multiplying a complex conjugate of each element in the chromatic dispersion sequences by that of another element which is away from the previous element by the preset interval, and calculating a sum of obtained products to obtain each correlation value.

In the above solution, the determining the chromatic dispersion value according to the first value, the frequency value per unit frequency interval of the frequency domain data and the preset interval includes:

calculating an argument of the first value to obtain a second value;

dividing the second value by the preset interval to obtain a third value;

multiplying a square of a wavelength of an optical signal corresponding to the frequency domain data by the frequency value per unit frequency interval of the frequency domain data and a system symbol rate to obtain a fourth value;

dividing velocity of light by the fourth value to obtain a fifth value; and multiplying the third value by the fifth value to obtain the chromatic dispersion value.

In the above solution, when there are two or more preset intervals, the two or more preset intervals have different values and, correspondingly, two or more first values are obtained; and when the third value is obtained, the method further includes: performing unwrapping process on the two or more preset intervals and the two or more corresponding second values to obtain the third value.

In the above solution, before the determining a chromatic dispersion value according to the first value, a frequency value per unit frequency interval of the frequency domain data and the preset interval, the method further includes:

performing filtering process on the first value to obtain a sixth value; and correspondingly, determining the chromatic dispersion value according to the sixth value, the frequency value per unit frequency interval of the frequency domain data and the preset interval.

In the above solution, the determining the chromatic dispersion value according to the sixth value, the frequency value per unit frequency interval of the frequency domain data and the preset interval includes:

calculating an argument of the sixth value to obtain a second value;

dividing the second value by the preset interval to obtain a third value;

multiplying a square of wavelength of an optical signal corresponding to the frequency domain data by the frequency value per unit frequency interval of the frequency domain data and a system symbol rate to obtain a fourth value;

dividing velocity of light by the fourth value to obtain a fifth value; and multiplying the third value by the fifth value to obtain the chromatic dispersion value.

In the above solution, when there are two or more preset intervals, the two or more preset intervals have different values and, correspondingly, two or more first values, two or more sixth values and two or more second values are obtained; and when the third value is obtained, the method further includes: performing unwrapping process on the two or more preset intervals and two or more corresponding second values to obtain the third value.

In the above solution, before the performing chromatic dispersion sequence process on acquired frequency domain data, the method further includes:

performing polarization rotation on the frequency domain data to generate multiple frequency domain data having different polarization directions; and correspondingly, performing chromatic dispersion sequence process on the generated multiple frequency domain data having different polarization directions.

In the above solution, before the performing polarization rotation on the frequency domain data, the method further includes:

acquiring the frequency domain data.

The embodiments of the present disclosure further provide a chromatic dispersion measurement device, including: a chromatic dispersion sequence processing module, a correlation operation processing module and a determining module;

the chromatic dispersion sequence processing module is configured to perform chromatic dispersion sequence process on acquired frequency domain data to obtain chromatic dispersion sequences of the frequency domain data, and send the obtained chromatic dispersion sequences to the correlation operation processing module;

the correlation operation processing module is configured to, after receiving the chromatic dispersion sequences sent by the chromatic dispersion sequence processing module, perform correlation operation process with a preset interval on the obtained chromatic dispersion sequences, respectively, calculate a sum of obtained correlation values to obtain a first value, and send the first value to the determining module; and the determining module is configured to determine a chromatic dispersion value according to the first value sent by the correlation operation processing module, a frequency value per unit frequency interval of the frequency domain data and the preset interval.

In the above solution, the device further includes a filtering module configured to perform filtering process on the first value to obtain a sixth value, and send the sixth value to the determining module; and correspondingly, the determining module is configured to determine the chromatic dispersion value according to the sixth value, the frequency value per unit frequency interval of the frequency domain data and the preset interval.

In the above solution, when the there are two or more preset intervals, the correlation operation processing module includes two or more correlation operation process submodules, and each of the correlation operation process submodules is configured to perform correlation operation process on one of the two or more preset intervals.

In the above solution, the filtering module includes two or more filtering submodules; and each of the correlation operation process submodules is configured to send data obtained by performing the correlation operation process to a corresponding filtering submodule; and each of the filtering submodules is configured to perform filtering process on the received data.

In the above solution, the device further includes a polarization rotation module configured to perform polarization rotation on acquired frequency domain data to generate multiple frequency domain data having different polarization directions, and send the generated multiple frequency domain data having different polarization directions to the chromatic dispersion sequence processing module; and correspondingly, the chromatic dispersion sequence processing module is configured to, after receiving the multiple frequency domain data having different polarization directions sent by the polarization rotation module, perform chromatic dispersion sequence process on the generated multiple frequency domain data having different polarization directions.

In the above solution, the device further includes:

a frequency domain data acquiring module configured to acquire frequency domain data and send the acquired frequency domain data to the polarization rotation module; and correspondingly, the polarization rotation module is configured to, after receiving the frequency domain data sent by the frequency domain data acquiring module, perform polarization rotation on the acquired frequency domain data to generate the multiple frequency domain data having different polarization directions.

The embodiments of the present disclosure further provide a digital coherent receiver including the foregoing chromatic dispersion measurement device.

The embodiments of the present disclosure further provide a computer storage medium, which includes a set of instructions, when the being executed, causing at least one processor to perform the foregoing chromatic dispersion measurement method.

According to the chromatic dispersion measurement method and device as well as the digital coherent receiver provided by the embodiments of the present disclosure, chromatic dispersion sequence process is performed on acquired frequency domain data to obtain chromatic dispersion sequences of the frequency domain data, correlation operation process with a preset interval is performed individually on the obtained chromatic dispersion sequences, a sum of obtained correlation values is calculated to obtain a first value, and a chromatic dispersion value is thus determined according to the first value, a frequency value per unit frequency interval of the frequency domain data and the preset interval. In this way, the chromatic dispersion value can be accurately determined with a high process efficiency.

BRIEF DESCRIPTION OF THE DRAWINGS

In accompanying drawings (may be not drawn in scale), similar reference numerals may describe similar parts in different views. Similar reference numerals having different letter suffixes may denote different examples of similar parts. The accompanying drawings roughly show various embodiments discussed herein by way of examples instead of restriction manners.

DETAILED DESCRIPTION

In various embodiments of the present disclosure: chromatic dispersion sequence process is performed on acquired frequency domain data to obtain chromatic dispersion sequences of the frequency domain data; correlation operation process with a preset interval is separately performed on the obtained chromatic dispersion sequences, and a sum of obtained correlation values is calculated to obtain a first value; and a chromatic dispersion value is determined according to the first value, a frequency value per unit frequency interval of the frequency domain data, and the preset interval.

The following further describes the present disclosure in detail with reference to the accompanying drawings and the embodiments.

Embodiment I

Figure 1:
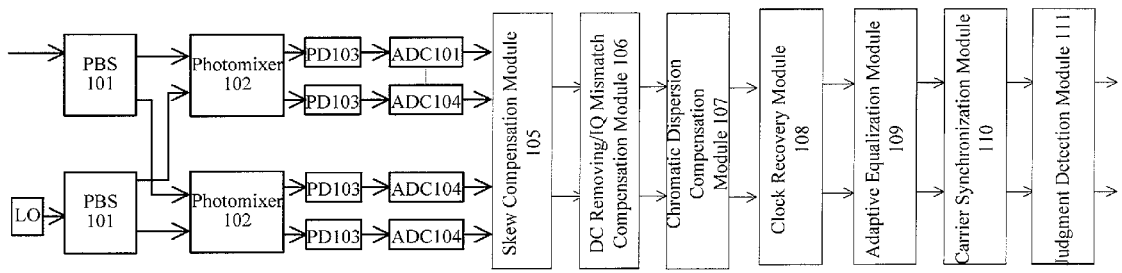
FIG. 1 is a block diagram illustrating signal process of a typical digital coherent receiver.
Figure 2:
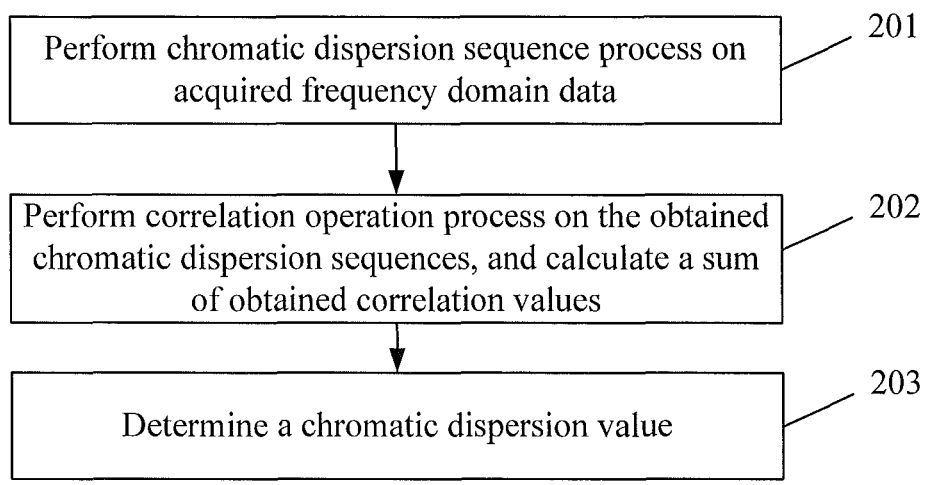
FIG. 2 is a schematic flow chart illustrating a chromatic dispersion measurement method according to Embodiment I of the present disclosure.

As shown in FIG. 2, the chromatic dispersion measurement method in this embodiment includes following steps.

Step 201: chromatic dispersion sequence process is performed on acquired frequency domain data to obtain chromatic dispersion sequences of the frequency domain data.

In an embodiment, the chromatic dispersion sequence process is specifically performed by:

multiplying a complex conjugate of an element in the frequency domain data by that of another element which is away from the previous element by a first distance, where the first distance equals to a system symbol rate.

The frequency domain data may include: first sub-frequency domain data and second sub-frequency domain data, where the first sub-frequency domain data refer to frequency domain data obtained through a first optical polarization; and the second sub-frequency domain data refer to frequency domain data obtained through a second optical polarization. Correspondingly, the obtained chromatic dispersion sequences may include two chromatic dispersion sequences respectively corresponding to the first sub-frequency domain data and the second sub-frequency domain data.

Step 202: correlation operation process with a preset interval is separately performed on the obtained chromatic dispersion sequences, and a sum of obtained correlation values is calculated to obtain a first value.

In an embodiment, the correlation operation process with a preset interval on the obtained chromatic dispersion sequences of the frequency domain data is specifically performed by:

separately multiplying a complex conjugate of each element in the chromatic dispersion sequences by that of another element which is away from the previous element by the preset interval, and calculating a sum of obtained products to obtain each correlation value.

The preset interval may be a positive integer, for example, 1, 2, 3 and so on.

The preset interval may be set up as proper, and there may be more than one preset interval. Specifically, when there is one preset interval, the preset interval may be set up in accordance with relevant parameters and indexes of an applied network environment. When there are two or more preset intervals, the preset intervals may be set up in accordance with relevant parameters and indexes of the applied network environment in combination with theories related to chromatic dispersion.

Step 203: a chromatic dispersion value is determined according to the first value, a frequency value per unit frequency interval of the frequency domain data, and the preset interval.

In an embodiment, determination of the chromatic dispersion value is determined according to the first value, a frequency value per unit frequency interval of the frequency domain data and the preset interval specifically includes:

calculating an argument of the first value to obtain a second value;

dividing the second value by the preset interval to obtain a third value;

multiplying a square of wavelength of an optical signal corresponding to the frequency domain data by the frequency value per unit frequency interval of the frequency domain data and a system symbol rate to obtain a fourth value;

dividing velocity of light by the fourth value to obtain a fifth value; and multiplying the third value by the fifth value to obtain the chromatic dispersion value.

A specific process procedure for obtaining the chromatic dispersion value according to the first value, the frequency value per unit frequency interval of the frequency domain data and the preset interval may be expressed by an equation as below:

$$CD = \frac{\arg(F)}{2\pi \times \Delta} \times \frac{c}{\lambda^2 \times \frac{f_s}{nfft} \times f_d} \quad (1)$$

where CD denotes the chromatic dispersion value, which has a unit of nanometer/nanosecond (nm/ns);

$$\frac{\arg(F)}{2\pi}$$

denotes the argument of the first value, which has a unit of turn; $\Delta$ denotes the preset interval, which has no unit; c denotes velocity of light, which has a unit of meter/second (m/s); $\lambda$ denotes a wavelength of the optical signal corresponding to the frequency domain data, which has a unit of nanometer (nm);

$$\frac{f_s}{nfft}$$

denotes the frequency value per unit frequency interval of the frequency domain data, which has a unit of GHz; and $f_d$ denotes the system symbol rate, which has a unit of Gbaud. In an embodiment, both the wavelength of the optical signal corresponding to the frequency domain data and the system symbol rate are preset, and the frequency value per unit frequency interval of the frequency domain data is obtained by dividing a sampling frequency) ($f_s$) by FFT points (nfft).

When only one preset interval having a relatively small value is used, for example, when the preset interval is 1, 2 or the like, it is believed that a determination accuracy is relatively low, and a range of the determined chromatic dispersion value is relatively large, which is disadvantageous to subsequent clock recovery process. However, when only one preset interval having a relatively large value is used, for example, when the preset interval is 16, 32 or the like, it is believed that the determination accuracy is relatively high, but the range of the determined chromatic dispersion value is relatively small, which is also disadvantageous to subsequent clock recovery process. Therefore, it is desirable to adopt a process manner where there are two or more preset intervals including a larger value and a smaller value.

When there are two or more preset intervals, the two or more preset intervals have different values. Correspondingly, there are two or more first values obtained, and there are also two or more second values. For example, supposing there are two preset intervals including a first preset interval and a second preset interval, where the first preset interval and the second preset interval have different values, correlation operation process with the first preset interval is separately performed on the obtained chromatic dispersion sequences, a sum of obtained correlation values is calculated to obtain a first value, and the argument of the first value is calculated to obtain a second value. Correlation operation process with the second preset interval is separately performed on the obtained chromatic dispersion sequences, the sum of the obtained correlation values is calculated to obtain another first value, and the another first value is calculated to obtain another second value. Therefore, two corresponding first values are obtained, and correspondingly, two corresponding second values are obtained.

In such a case, when the third value is obtained, the method may further include: performing unwrapping process on the two or more preset intervals and the two or more corresponding second values to obtain the third value. Herein, an integral multiple of phase ambiguity may likely be generated when there are two or more preset intervals. Therefore, unwrapping process is needed.

In practical application, there may be various concrete implementation methods for obtaining the third value by performing unwrapping process on the two or more preset intervals and the two or more corresponding second values, which are technical means frequently used by those skilled in the art.

The following gives a practical application example for obtaining the third value by performing unwrapping process on the two or more preset intervals and the two or more corresponding second values.

Specifically, supposing there are N (N≥1) preset intervals, and $\Delta_1 < \Delta_2 < \ldots < \Delta_N$, the first values corresponding to the preset intervals are respectively $F_1, F_2 \ldots F_N$, the argument of each of the first values is calculated as following:

for $\Delta_1$, the argument is $$\Phi_1 = \frac{\arg(F_1)}{2\pi};$$

for $\Delta_2$, the argument is $$\Phi_2 = \frac{\arg(F_2)}{2\pi},$$

and by analogy, for $\Delta_x$, the argument is $$\Phi_N = \frac{\arg(F_N)}{2\pi};$$

unwrapping process performed on $\Phi_2, \Phi_3, \ldots, \Phi_N$ includes:

$$\Phi'_1 = \Phi_1$$

$$\Phi'_n = \Phi_n + \text{round}\left[\frac{\Delta_n}{\Delta_{n-1}}\Phi'_{n-1} - \Phi_n\right], n = 2, \ldots, N;$$

where round denotes a rounding-off operation.

Correspondingly, the third value obtained through the unwrapping process is substituted into Equation (1):

$$CD = \frac{\Phi'_n}{\Delta_N} \times \frac{c}{\lambda^2 \times \frac{f_s}{n\textit{fft}} \times f_d} \quad (2)$$

Prior to determination of the chromatic dispersion value according to the first value, a frequency value per unit frequency interval of the frequency domain data and the preset interval, the method may further include:

performing filtering process on the first value to obtain a sixth value, where the sixth value is a complex number;

correspondingly, determining the chromatic dispersion value according to the sixth value, the frequency value per unit frequency interval of the frequency domain data and the preset interval;

specifically, calculating the argument of the sixth value to obtain a second value;

dividing the second value by the preset interval to obtain a third value;

multiplying a square of wavelength of an optical signal corresponding to the frequency domain data by the frequency value per unit frequency interval of the frequency domain data and a system symbol rate to obtain a fourth value;

dividing velocity of light by the fourth value to obtain a fifth value; and multiplying the third value by the fifth value to obtain the chromatic dispersion value.

A specific process procedure for obtaining the chromatic dispersion value according to the sixth value, the frequency value per unit frequency interval of the frequency domain data and the preset interval may be expressed by an equation as below:

$$CD = \frac{\arg(G)}{2\pi \times \Delta} \times \frac{c}{\lambda^2 \times \frac{f_s}{n\textit{fft}} \times f_d} \quad (3)$$

where CD denotes the chromatic dispersion value, which has a unit of nanometer/nanosecond (nm/ns);

$$\frac{\arg(G)}{2\pi}$$

denotes the argument of the sixth value, which has a unit of turn; $\Delta$ denotes the preset interval, which has no unit; c denotes velocity of light, which has a unit of meter/second (m/s); $\lambda$ denotes a wavelength of the optical signal corresponding to the frequency domain data, which has a unit of nanometer (nm);

$$\frac{f_s}{n\textit{fft}}$$

denotes the frequency value per unit frequency interval of the frequency domain data, which has a unit of GHz; and $f_d$ denotes the system symbol rate, which has a unit of Gbaud. In an embodiment, both the wavelength of the optical signal corresponding to the frequency domain data and the system symbol rate are preset, and the frequency value per unit frequency interval of the frequency domain data is obtained by dividing the sampling frequency ($f_s$) by FFT points (nfft).

In an embodiment, when there are two or more preset intervals, the two or more preset intervals have different values, and before determination of the chromatic dispersion value according to the first value, the frequency value per unit frequency interval of the frequency domain data and the preset interval, filtering process is performed on the first value, there are two or more first values obtained, then there are also two or more sixth values, and there are also two or more second values. For example, supposing there are two preset intervals including a first preset interval and a second preset interval, where the first preset interval and the second preset interval have different values, correlation operation process with the first preset interval is separately performed on the obtained chromatic dispersion sequences, a sum of obtained correlation values is calculated to obtain a first value, filtering process is performed on the obtained first value to obtain a sixth value, and the argument of the sixth value is calculated to obtain a second value. Correlation operation process with the second preset interval is separately performed on the obtained chromatic dispersion sequences, the sum of the obtained correlation values is calculated to obtain another first value, filtering process is performed on the obtained another first value to obtain another sixth value, and the argument of the another sixth value is calculated to obtain another second value. Accordingly, two corresponding first values are obtained, and correspondingly, two corresponding sixth values are obtained, and two corresponding second values are obtained.

In such a case, when the third value is obtained, the method may further include: performing unwrapping process on the two or more preset intervals and the two or more corresponding second values to obtain the third value. Herein, an integral multiple of phase ambiguity may likely be generated when there are two or more preset intervals. Therefore, unwrapping process is needed.

In practical application, there may be various concrete implementation methods for obtaining the third value by performing unwrapping process on the two or more preset intervals and the two or more corresponding second values, which are technical means frequently used by those skilled in the art.

The chromatic dispersion measurement method provided by the embodiments of the present disclosure is proposed based on relevant characteristics of a chromatic dispersion channel, and can accurately determine a chromatic dispersion value with a high processing efficiency.

Among traditional chromatic dispersion measurement methods, there is a method for feedback control of a variable chromatic dispersion compensator by using transmission quality information (such as an error rate, a Q factor and so on). The basic idea of this method is as below: a dispersion compensation amount of a chromatic dispersion compensation filter is changed at a chromatic dispersion spacing of a certain step length until the digital coherent receiver system converges. When this method is used, however, as the digital coherent receiver system is started, a search process is slow, and thus a determined chromatic dispersion value is low in precision. In addition, owing to variation of environment temperature, a chromatic dispersion value of an optical fiber link may also slowly change. Therefore, it is difficult to identify a slow change of a chromatic dispersion value in running of the digital coherent receiver system by using this method.

In comparison, the chromatic dispersion measurement method provided by this embodiment adopts a manner of direct calculation without search. Therefore, when the digital coherent receiver system is started, a chromatic dispersion value of a link may be quickly estimated Moreover, when the digital coherent receiver system is running, a chromatic dispersion value of the link may be estimated continuously to track its change so as to provide accurate dispersion compensation for the chromatic dispersion compensation module, thereby reducing a complexity in processing of the clock recovery module, etc.

In addition, it is used a processing manner in which there are two or more preset intervals, so that the range of the chromatic dispersion value can be more accurately determined.

Furthermore, filtering process is performed on the first value to obtain the sixth value; and correspondingly, the chromatic dispersion value is determined according to the sixth value, the frequency value per unit frequency interval of the frequency domain data and the preset interval. In this way, the range of the chromatic dispersion value can be determined more accurately.

Embodiment II

Figure 3:
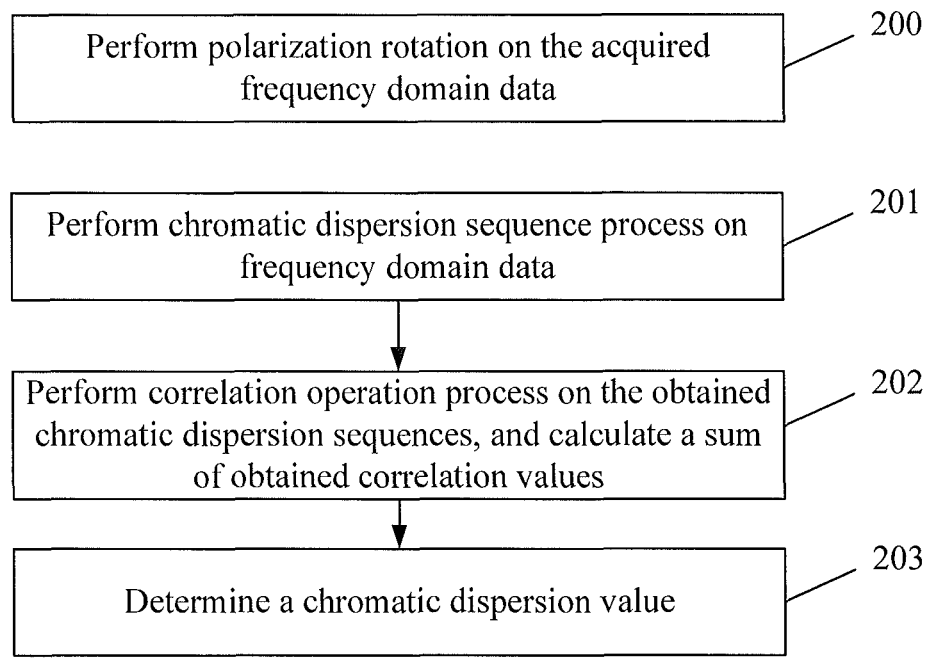
FIG. 3 is a schematic flow chart illustrating a chromatic dispersion measurement method according to Embodiment II of the present disclosure.

As shown in FIG. 3, the chromatic dispersion measurement method in this embodiment includes the following steps.

Step 200: polarization rotation is performed on the obtained frequency domain data to generate multiple frequency domain data having different polarization directions.

In an embodiment, the prior art may be adopted for concrete implementation of this step.

The specific number of the generated frequency domain data having different polarization directions may be determined according to needs.

Before this step is executed, the method may further include:

acquiring frequency domain data.

Specifically, in practical application, received time domain data may be converted to the frequency domain data; or the frequency domain data may be directly acquired. Herein, it is a technical means frequently used by those skilled in the art to convert the received time domain data to the frequency domain data, which is not described.

Step 201: chromatic dispersion sequence process is performed on acquired frequency domain data to obtain chromatic dispersion sequences of the frequency domain data.

In an embodiment, the chromatic dispersion sequence process performed on acquired frequency domain data refers to: performing chromatic dispersion sequence process on the generated multiple frequency domain data having different polarization directions.

In an embodiment, the chromatic dispersion sequence process specifically includes:

multiplying a complex conjugate of an element in the frequency domain data by that of another element which is away from the previous element by a first distance, where the first distance equals to a system symbol rate.

The frequency domain data may include: first sub-frequency domain data and second sub-frequency domain data, where the first sub-frequency domain data refers to frequency domain data obtained through a first optical polarization; and the second sub-frequency domain data refers to frequency domain data obtained through a second optical polarization. Correspondingly, the obtained chromatic dispersion sequences include two chromatic dispersion sequences respectively corresponding to the first sub-frequency domain data and the second sub-frequency domain data.

Step 202: correlation operation process with a preset interval is separately performed on the obtained chromatic dispersion sequences, and a sum of obtained correlation values is calculated to obtain a first value.

In an embodiment, the correlation operation process separately performed on the obtained chromatic dispersion sequences of the frequency domain data at a preset interval specifically includes:

separately multiplying a complex conjugate of each element in the chromatic dispersion sequences by that of another element which is away from the previous element by the preset interval, and calculating a sum of obtained products to obtain each correlation value.

In an embodiment, the preset interval is a positive integer, for example, 1, 2, 3 and so on.

The preset interval may be set up as proper, and there may be more than one preset interval. Specifically, when there is one preset interval, the preset interval may be set up in accordance with relevant parameters and indexes of an applied network environment. When there are two or more preset intervals, the preset intervals may be set up in accordance with relevant parameters and indexes of the applied network environment in combination with theories related to chromatic dispersion.

Step 203: a chromatic dispersion value is determined according to the first value, a frequency value per unit frequency interval of the frequency domain data and the preset interval.

In an embodiment, determination of the chromatic dispersion value according to the first value, a frequency value per unit frequency interval of the frequency domain data and the preset interval specifically includes:

calculating an argument of the first value to obtain a second value;

dividing the second value by the preset interval to obtain a third value;

multiplying a square of wavelength of an optical signal corresponding to the frequency domain data by the frequency value per unit frequency interval of the frequency domain data and a system symbol rate to obtain a fourth value;

dividing velocity of light by the fourth value to obtain a fifth value; and multiplying the third value by the fifth value to obtain the chromatic dispersion value.

In an embodiment, a specific process procedure for obtaining the chromatic dispersion value according to the first value, the frequency value per unit frequency interval of the frequency domain data and the preset interval is expressed by an equation as below:

$$CD = \frac{\arg(F)}{2\pi \times \Delta} \times \frac{c}{\lambda^2 \times \frac{f_s}{nfft} \times f_d} \quad (1)$$

where CD denotes the chromatic dispersion value, which has a unit of nanometer/nanosecond (nm/ns);

$$\frac{\arg(F)}{2\pi}$$

denotes the argument of the first value, which has a unit of turn; $\Delta$ denotes the preset interval, which has no unit; c denotes velocity of light, which has a unit of meter/second (m/s); $\lambda$ denotes a wavelength of the optical signal corresponding to the frequency domain data, which has a unit of nanometer (nm);

$$\frac{f_s}{nfft}$$

denotes the frequency value per unit frequency interval of the frequency domain data, which has a unit of GHz; and $f_d$ denotes the system symbol rate, which has a unit of Gbaud. In an embodiment, both the wavelength of the optical signal corresponding to the frequency domain data and the system symbol rate each are preset, and the frequency value per unit frequency interval of the frequency domain data is obtained by dividing the sampling frequency ($f_s$) by FFT points (nfft).

When only one preset interval having a relatively small value is used, for example, when the preset interval is 1, 2 or the like, it is believed that a determination accuracy is relatively low, and a range of the determined chromatic dispersion value is relatively large, which is disadvantageous to subsequent clock recovery process. However, when only one preset interval having a relatively large value is used, for example, when the preset interval is 16, 32 or the like, it is believed that the determination accuracy is relatively high, but the range of the determined chromatic dispersion value is relatively small, which is also disadvantageous to subsequent clock recovery process. Therefore, it is desirable to adopt a process manner where there are two or more preset intervals including a larger value and a smaller value.

When there are two or more preset intervals, the two or more preset intervals have different values. Correspondingly, there are two or more first values obtained, and there are also two or more second values. For example, supposing there are two preset intervals including a first preset interval and a second preset interval, where the first preset interval and the second preset interval have different values, correlation operation process with the first preset interval is separately performed on the obtained chromatic dispersion sequences, a sum of obtained correlation values is calculated to obtain a first value, and the argument of the first value is calculated to obtain a second value. Correlation operation process with the second preset interval is separately performed on the obtained chromatic dispersion sequences, the sum of the obtained correlation values is calculated to obtain another first value, and the another first value is calculated to obtain another second value. Accordingly, two corresponding first values are obtained, and correspondingly, two corresponding second values are obtained.

In such a case, when the third value is obtained, the method may further include: performing unwrapping process on the two or more preset intervals and the two or more corresponding second values to obtain the third value. Herein, an integral multiple of phase ambiguity may likely be generated when there are two or more preset intervals. Therefore, unwrapping process is needed.

In practical application, there may be various concrete implementation methods for obtaining the third value by performing unwrapping process on the two or more preset intervals and the two or more corresponding second values, which are technical means frequently used by those skilled in the art.

The following gives a practical application example for obtaining the third value by performing unwrapping process on the two or more preset intervals and the two or more corresponding second values.

Specifically, supposing there are N (N≥1) preset intervals, and $\Delta_1 < \Delta_2 < \ldots < \Delta_N$, the first values corresponding to the preset intervals are respectively $F_1, F_2 \ldots F_N$, the argument of each of the first values is calculated as following:

for $\Delta_1$, the argument is $$\Phi_1 = \frac{\arg(F_1)}{2\pi};$$

for $\Delta_2$, the argument is $$\Phi_2 = \frac{\arg(F_2)}{2\pi},$$

and by analogy, for $\Delta_N$, the argument is $$\Phi_N = \frac{\arg(F_N)}{2\pi};$$

unwrapping process performed on $\Phi_2, \Phi_3, \ldots, \Phi_N$ includes:

$$\Phi'_1 = \Phi_1$$

-continued $$\Phi'_n = \Phi_n + \text{round}\left[\frac{\Delta_n}{\Delta_{n-1}}\Phi'_{n-1} - \Phi_n\right], n = 2, \ldots, N;$$

where round denotes a rounding-off operation.

Correspondingly, the third value obtained through the unwrapping process is substituted into Equation (1):

$$CD = \frac{\Phi'_n}{\Delta_N} \times \frac{c}{\lambda^2 \times \frac{f_s}{nfft} \times f_d} \quad (2)$$

Prior to determination of the chromatic dispersion value according to the first value, a frequency value per unit frequency interval of the frequency domain data and the preset interval, the method may further include:

performing filtering process on the first value to obtain a sixth value, where the sixth value is a complex number;

correspondingly, determining the chromatic dispersion value according to the sixth value, the frequency value per unit frequency interval of the frequency domain data and the preset interval;

specifically, calculating an argument of the sixth value to obtain a second value;

dividing the second value by the preset interval to obtain a third value;

multiplying a square of wavelength of an optical signal corresponding to the frequency domain data by the frequency value per unit frequency interval of the frequency domain data and a system symbol rate to obtain a fourth value;

dividing velocity of light by the fourth value to obtain a fifth value; and multiplying the third value by the fifth value to obtain the chromatic dispersion value.

In an embodiment, a specific process procedure for obtaining the chromatic dispersion value according to the sixth value, the frequency value per unit frequency interval of the frequency domain data and the preset interval is expressed by an equation as below:

$$CD = \frac{\arg(G)}{2\pi \times \Delta} \times \frac{c}{\lambda^2 \times \frac{f_s}{nfft} \times f_d} \quad (3)$$

where CD denotes the chromatic dispersion value, which has a unit of nanometer/nanosecond (nm/ns);

$$\frac{\arg(G)}{2\pi}$$

denotes the argument of the sixth value, which has a unit of turn; $\Delta$ denotes the preset interval, which has no unit; c denotes velocity of light, which has a unit of meter/second (m/s); $\lambda$ denotes a wavelength of the optical signal corresponding to the frequency domain data, which has a unit of nanometer (nm);

$$\frac{f_s}{nfft}$$

denotes the frequency value per unit frequency interval of the frequency domain data, which has a unit of GHz; and $f_d$ denotes the system symbol rate, which has a unit of Gbaud.

In an embodiment, both the wavelength of the optical signal corresponding to the frequency domain data and the system symbol rate are preset, and the frequency value per unit frequency interval of the frequency domain data is obtained by dividing the sampling frequency ($f_s$) by FFT points (nfft).

In an embodiment, when there are two or more preset intervals is two or more, the two or more preset intervals have different values, and before determination of the chromatic dispersion value according to the first value, the frequency value per unit frequency interval of the frequency domain data and the preset interval, filtering process is performed on the first value, there are two or more first values obtained, then there are also two or more sixth values, and there are also two or more second values. For example, supposing there are two preset intervals including a first preset interval and a second preset interval, where the first preset interval and the second preset interval have different values, correlation operation process with the first preset interval is separately performed on the obtained chromatic dispersion sequences, a sum of obtained correlation values is calculated to obtain a first value, filtering process is performed on the obtained first value to obtain a sixth value, and the argument of the sixth value is calculated to obtain a second value. Correlation operation process with the second preset interval is separately performed on the obtained chromatic dispersion sequences, the sum of the obtained correlation values is calculated to obtain another first value, filtering process is performed on the another first value to obtain another sixth value, and the argument of the another sixth value is calculated to obtain another second value. Accordingly, two corresponding first values are obtained, and correspondingly, two corresponding sixth values are obtained, and two corresponding second values are obtained.

In such a case, when the third value is obtained, the method may further include: performing unwrapping process on the two or more preset intervals and the two or more corresponding second values to obtain the third value. Herein, an integral multiple of phase ambiguity may likely be generated when there are two or more preset intervals. Therefore, unwrapping process is needed.

In practical application, there may be various concrete implementation methods for obtaining the third value by performing unwrapping process on the two or more preset intervals and the two or more corresponding second values, which are technical means frequently used by those skilled in the art.

The chromatic dispersion measurement method provided by the embodiments of the present disclosure is proposed based on relevant characteristics of a chromatic dispersion channel, and can accurately determine a chromatic dispersion value with a high processing efficiency.

Among traditional chromatic dispersion measurement methods, there is a method for feedback control of a variable chromatic dispersion compensator by using transmission quality information (such as an error rate, a Q factor and so on). The basic idea of this method is as below: a dispersion compensation amount of a chromatic dispersion compensation filter is changed at a chromatic dispersion spacing of a certain step length until the digital coherent receiver system converges. When this method is used, however, as the digital coherent receiver system is started, a search process is slow, therefore, a determined chromatic dispersion value is low in precision. In addition, owing to variation of environment temperature, a chromatic dispersion value of an optical fiber link may also slowly change. Therefore, it is difficult to identify a slow change of a chromatic dispersion value in the digital coherent receiver system by using this method.

In comparison, the chromatic dispersion measurement method provided by the embodiments adopts a manner of direct calculation without search. Therefore, when the digital coherent receiver system is started, a chromatic dispersion value of a link may be quickly estimated. Moreover, when the digital coherent receiver system is running, a chromatic dispersion value of the link may be estimated continuously to track its change so as to provide accurate dispersion compensation for the chromatic dispersion compensation module, thereby reducing a complexity in process of the clock recovery module, etc.

In addition, it is used a process manner in which the number of the preset intervals is two or more, so that the range of the chromatic dispersion value can be more accurately determined.

Furthermore, filtering process is performed on the first value to obtain the sixth value; and correspondingly, the chromatic dispersion value is determined according to the sixth value, the frequency value per unit frequency interval of the frequency domain data and the preset interval. In this way, the range of the chromatic dispersion value can be determined more accurately.

Embodiment III

Figure 4:
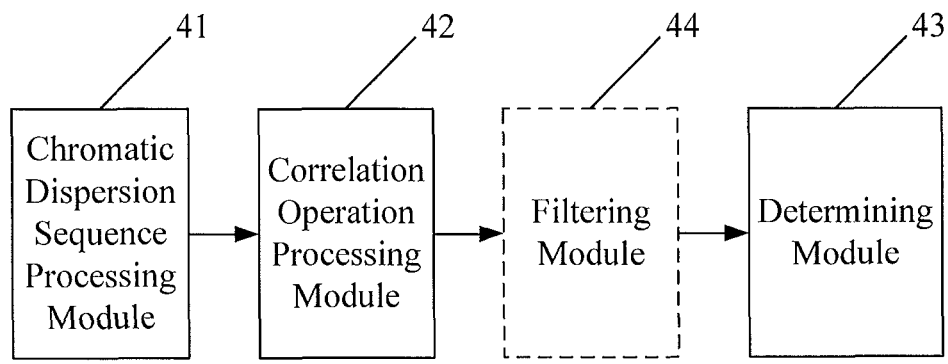
FIG. 4 is a block diagram illustrating a chromatic dispersion measurement device according to Embodiment III of the present disclosure.

In order to implement the method in Embodiment I, this embodiment provides a chromatic dispersion measurement device. As shown in FIG. 4, the device includes: a chromatic dispersion sequence processing module 41, a correlation operation processing module 42 and a determining module 43.

In an embodiment, the chromatic dispersion sequence processing module 41 is configured to perform chromatic dispersion sequence process on acquired frequency domain data to obtain chromatic dispersion sequences of the frequency domain data, and send the obtained chromatic dispersion sequences to the correlation operation processing module 42.

The correlation operation processing module 42 is configured to, after receiving the chromatic dispersion sequences sent by the chromatic dispersion sequence processing module 41, separately perform correlation operation process with a preset interval on the obtained chromatic dispersion sequences, calculate a sum of obtained correlation values to obtain a first value, and send the first value to the determining module 43

The determining module 43 is configured to determine a chromatic dispersion value according to the first value sent by the correlation operation processing module 42, a frequency value per unit frequency interval of the frequency domain data and the preset interval.

In an embodiment, the chromatic dispersion sequence process specifically includes:

multiplying a complex conjugate of an element in the frequency domain data by that of another element which is away from the previous element by a first distance, where the first distance is a system symbol rate.

The frequency domain data may include first sub-frequency domain data and second sub-frequency domain data, where the first sub-frequency domain data refers to frequency domain data obtained through a first optical polarization; and the second sub-frequency domain data refers to frequency domain data obtained through a second optical polarization. Correspondingly, the obtained chromatic dispersion sequences include two chromatic dispersion sequences respectively corresponding to the first sub-frequency domain data and the second sub-frequency domain data.

The correlation operation process separately performed with the preset interval on the obtained chromatic dispersion sequences of the frequency domain data may specifically include:

separately multiplying a complex conjugate of each element in the chromatic dispersion sequences by that of another element which is away from the previous element by the preset interval, and calculating a sum of obtained products to obtain each correlation value.

In an embodiment, the preset interval is a positive integer, for example, 1, 2, 3 and so on.

The preset interval may be set up as proper, and there may be one or more preset intervals. Specifically, when there is one preset interval, the preset interval may be set up in accordance with relevant parameters and indexes of an applied network environment. When there are two or more preset intervals, the preset intervals may be set up in accordance with relevant parameters and indexes of the applied network environment in combination with theories related to chromatic dispersion.

The determining module 43 is specifically configured to:

calculate an argument of the first value to obtain a second value;

divide the second value by the preset interval to obtain a third value;

multiply a square of wavelength of an optical signal corresponding to the frequency domain data by the frequency value per unit frequency interval of the frequency domain data and a system symbol rate to obtain a fourth value;

divide velocity of light by the fourth value to obtain a fifth value; and multiply the third value by the fifth value to obtain the chromatic dispersion value.

In an embodiment, a specific process procedure for obtaining a chromatic dispersion value according to the first value, a frequency value per unit frequency interval of the frequency domain data and the preset interval is expressed by an equation as below:

$$CD = \frac{\arg(F)}{2\pi \times \Delta} \times \frac{c}{\lambda^2 \times \frac{f_s}{nfft} \times f_d} \quad (1)$$

where CD denotes the chromatic dispersion value, which has a unit of nanometer/nanosecond (nm/ns);

$$\frac{\arg(F)}{2\pi}$$

denotes the argument of the first value, which has a unit of turn; $\Delta$ denotes the preset interval, which has no unit; c denotes velocity of light, which has a unit of meter/second (m/s); $\lambda$ denotes a wavelength of the optical signal corresponding to the frequency domain data, which has a unit of nanometer (nm);

$$\frac{f_s}{nfft}$$

denotes the frequency value per unit frequency interval of the frequency domain data, which has a unit of GHz; and $f_d$ denotes the system symbol rate, which has a unit of Gbaud. In an embodiment, both the wavelength of the optical signal corresponding to the frequency domain data and the system symbol rate are preset, and the frequency value per unit frequency interval of the frequency domain data is obtained by dividing the sampling frequency ($f_s$) by FFT points (nfft).

When only one preset interval having a relatively small value is used, for example, when the preset interval is 1, 2 or the like, it is believed that a determination accuracy is relatively low, and a range of the determined chromatic dispersion value is relatively large, which is disadvantageous to subsequent clock recovery process. However, when only one preset interval having a relatively large value is used, for example, when the preset interval is 16, 32 or the like, it is believed that the determination accuracy is relatively high, but the range of the determined chromatic dispersion value is relatively small, which is also disadvantageous to subsequent clock recovery process. Therefore, it is desirable to adopt a process manner where there are two or more the preset intervals including a larger value and a smaller value.

When there are two or more preset intervals, the two or more preset intervals have different values. Correspondingly, there are two or more first values obtained, and there are also two or more second values. In other words, the correlation operation processing module 42 includes two or more correlation operation process submodules. For example, supposing there are two preset intervals including a first preset interval and a second preset interval, where the first preset interval and the second preset interval have different values and the correlation operation processing module 42 includes a first correlation operation process submodule and a second correlation operation process submodule, correlation operation process with the first preset interval is separately performed on the obtained chromatic dispersion sequences by the first correlation operation process submodule, a sum of obtained correlation values is calculated to obtain a first value, and the argument of the first value is calculated by the determining module 43 to obtain a second value. Correlation operation process with the second preset interval is separately performed on the obtained chromatic dispersion sequences by the second correlation operation process submodule, the sum of the obtained correlation values is calculated to obtain another first value, and the another first value is calculated by the determining module 43 to obtain another second value. Accordingly, two corresponding first values are obtained, and correspondingly, two corresponding second values are obtained.

In such a case, when the third value is obtained, the determining module 43 is further configured to perform unwrapping process on the two or more preset intervals and the two or more corresponding second values to obtain the third value. Herein, an integral multiple of phase ambiguity may likely be generated when there are two or more preset intervals. Therefore, unwrapping process is needed.

In practical application, there may be various concrete implementation methods for obtaining the third value by performing unwrapping process on the two or more preset intervals and the two or more corresponding second values, which are technical means frequently used by those skilled in the art.

The following gives a practical application example for obtaining the third value by performing unwrapping process on the two or more preset intervals and the two or more corresponding second values.

Specifically, supposing there are more than N preset intervals, and $\Delta_1 < \Delta_2 < \ldots < \Delta_N$, the first values corresponding to the preset intervals are respectively $F_1, F_2 \ldots F_N$, the argument of each of the first values is calculated as following:

for $\Delta_1$, the argument is $$\Phi_1 = \frac{\arg(F_1)}{2\pi};$$

for $\Delta_2$, the argument is $$\Phi_2 = \frac{\arg(F_2)}{2\pi};$$

and by analogy, for $\Delta_N$, the argument is $$\Phi_N = \frac{\arg(F_N)}{2\pi};$$

unwrapping process performed on $\Phi_2, \Phi_3, \ldots, \Phi_N$ includes:

$$\Phi'_1 = \Phi_1$$

$$\Phi'_n = \Phi_n + \text{round}\left[\frac{\Delta_n}{\Delta_{n-1}}\Phi'_{n-1} - \Phi_n\right], n = 2, \ldots, N;$$

where round denotes a rounding-off operation.

Correspondingly, the third value obtained through the unwrapping process is substituted into Equation (1):

$$CD = \frac{\Phi'_N}{\Delta_N} \times \frac{c}{\lambda^2 \times \frac{f_s}{nfft} \times f_d} \qquad (2)$$

The device may further include a filtering module 44 configured to perform filtering process on the first value to obtain a sixth value and send the sixth value to the determining module 43, where the sixth value is a complex number.

Correspondingly, the determining module 43 is configured to determine the chromatic dispersion value according to the sixth value, the frequency value per unit frequency interval of the frequency domain data and the preset interval.

The determining module 43 is specifically configured to:

calculate an argument of the sixth value to obtain a second value;

divide the second value by the preset interval to obtain a third value;

multiply a square of wavelength of an optical signal corresponding to the frequency domain data by the frequency value per unit frequency interval of the frequency domain data and a system symbol rate to obtain a fourth value;

divide velocity of light by the fourth value to obtain a fifth value; and multiply the third value by the fifth value to obtain the chromatic dispersion value.

In an embodiment, a specific process procedure for obtaining a chromatic dispersion value according to the first value, the frequency value per unit frequency interval of the frequency domain data and the preset interval is expressed by an equation as below:

$$CD = \frac{\arg(G)}{2\pi \times \Delta} \times \frac{c}{\lambda^2 \times \frac{f_s}{nfft} \times f_d} \quad (3)$$

where CD denotes the chromatic dispersion value, which has a unit of nanometer/nanosecond (nm/ns);

$$\frac{\arg(G)}{2\pi}$$

denotes the argument of the sixth value, which has a unit of turn; $\Delta$ denotes the preset interval, which has no unit; c denotes velocity of light, which has a unit of meter/second (m/s); $\lambda$ denotes a wavelength of the optical signal corresponding to the frequency domain data, which has a unit of nanometer (nm);

$$\frac{f_s}{nfft}$$

denotes the frequency value per unit frequency interval of the frequency domain data, which has a unit of GHz; and $f_d$ denotes the system symbol rate, which has a unit of Gbaud.

In an embodiment, both the wavelength of the optical signal corresponding to the frequency domain data and the system symbol rate are preset, and the frequency value per unit frequency interval of the frequency domain data is obtained by dividing the sampling frequency ($f_s$) by FFT points (nfft).

In an embodiment, when there are two or more preset intervals, the two or more preset intervals have different values, and before determination of the chromatic dispersion value according to the first value, the frequency value per unit frequency interval of the frequency domain data and the preset interval, filtering process is performed on the first value, then there are two or more first values obtained, there are also two or more sixth values, and there are also two or more second values. In other words, the correlation operation processing module 42 includes two or more correlation operation process submodules, and correspondingly, the filtering module 44 includes two or more corresponding filtering submodules. For example, supposing there are two preset intervals including a first preset interval and a second preset interval, where the first preset interval and the second preset interval have different values, the correlation operation processing module 42 includes a first correlation operation process submodule and a second correlation operation process submodule, the filtering module 44 includes a first filtering submodule and a second filtering submodule, correlation operation process with the first preset interval is separately performed by the first correlation operation process submodule on the obtained chromatic dispersion sequences, a sum of obtained correlation values is calculated to obtain a first value, filtering process is performed by the first filtering submodule on the first value to obtain a sixth value, and the argument of the sixth value is calculated by the determining module 43 to obtain a second value. Correlation operation process with the second preset interval is separately performed by the second correlation operation process submodule on the obtained chromatic dispersion sequences, the sum of the obtained correlation values is calculated to obtain another first value, filtering process is performed by the second filtering submodule on the another first value to obtain another sixth value, and the argument of the another sixth value is calculated by the determining module 43 to obtain another second value. Accordingly, two corresponding first values are obtained, and correspondingly, two corresponding sixth values are obtained, and two corresponding second values are obtained.

In such a case, when the third value is obtained, the determining module 43 is further configured to perform unwrapping process on the two or more preset intervals and the two or more corresponding second values to obtain the third value. Herein, an integral multiple of phase ambiguity may likely be generated when there are two or more preset intervals. Therefore, unwrapping process is needed.

In practical application, there may be various concrete implementation methods for obtaining the third value by performing unwrapping process on the two or more preset intervals and two or more corresponding second values, which are technical means frequently used by those skilled in the art.

The chromatic dispersion measurement device provided by this embodiment of the present disclosure is proposed based on relevant characteristics of a chromatic dispersion channel, and can accurately determine a chromatic dispersion value with a high processing efficiency.

In addition, it is used a processing manner in which there are two or more preset intervals, so that the range of the chromatic dispersion value can be more accurately determined.

Furthermore, filtering process is performed on the first value to obtain the sixth value; and correspondingly, the chromatic dispersion value is determined according to the sixth value, the frequency value per unit frequency interval of the frequency domain data and the preset interval. In this way, the range of the chromatic dispersion value can be determined more accurately.

Embodiment IV

Figure 5:
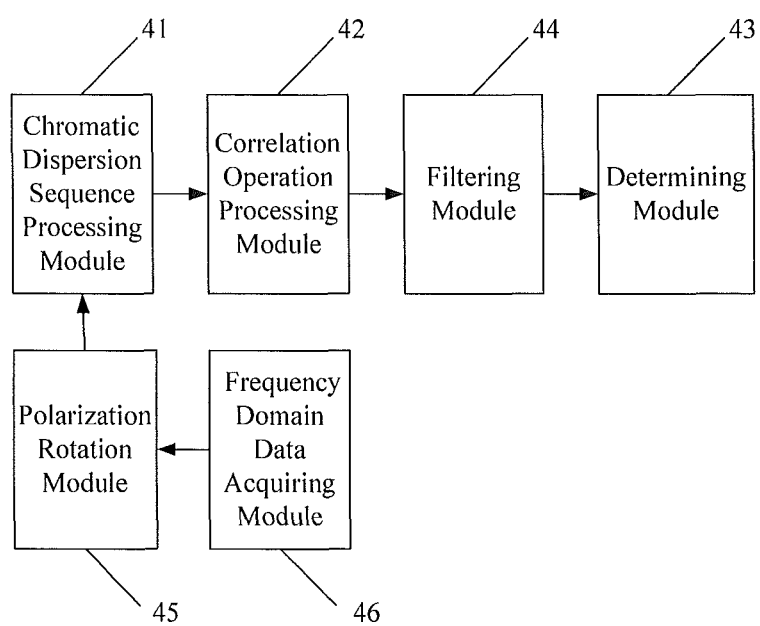
FIG. 5 is a block diagram illustrating a chromatic dispersion measurement device according to Embodiment IV of the present disclosure.

The chromatic dispersion measurement device provided by this embodiment is as shown in FIG. 5. In addition to units according to Embodiment III, the device further includes a polarization rotation module 45 configured to perform polarization rotation on acquired frequency domain data to generate multiple frequency domain data having different polarization directions and send the generated multiple frequency domain data having different polarization directions to the chromatic dispersion sequence processing module 41.

Correspondingly, the chromatic dispersion sequence processing module 41 may be configured to perform chromatic dispersion sequence process on the generated multiple frequency domain data having different polarization directions after receiving the multiple frequency domain data having different polarization directions sent by the polarization rotation module 45.

The device may further include a frequency domain data acquiring module 46 configured to acquire frequency domain data and send the acquired frequency domain data to the polarization rotation module 45.

Correspondingly, the polarization rotation module 45 may be configured to perform polarization rotation on the acquired frequency domain data to generate the multiple frequency domain data having different polarization directions after receiving the frequency domain data sent by the frequency domain data acquiring module 46.

In practical application, the frequency domain data acquiring module 46 may convert received time domain data to the frequency domain data, or directly acquire the frequency domain data from a corresponding position. Herein, it is a technical means frequently used by those skilled in the art to convert the received time domain data to the frequency domain data, which will be not elaborated.

With reference to Embodiment III and Embodiment IV, in practical application, the chromatic dispersion sequence processing module, the correlation operation processing module, the determining module and the frequency domain data acquiring module may be implemented by a central processing unit (CPU), a digital signal processor (DSP) or a field-programmable gate array (FPGA) in the chromatic dispersion measurement device. The filtering module may be implemented by a filter in the chromatic dispersion measurement device, particularly, a low-pass filter. The polarization rotation module may be implemented by a polarization rotation filter bank in the chromatic dispersion measurement device.

Embodiment V

Figure 6:
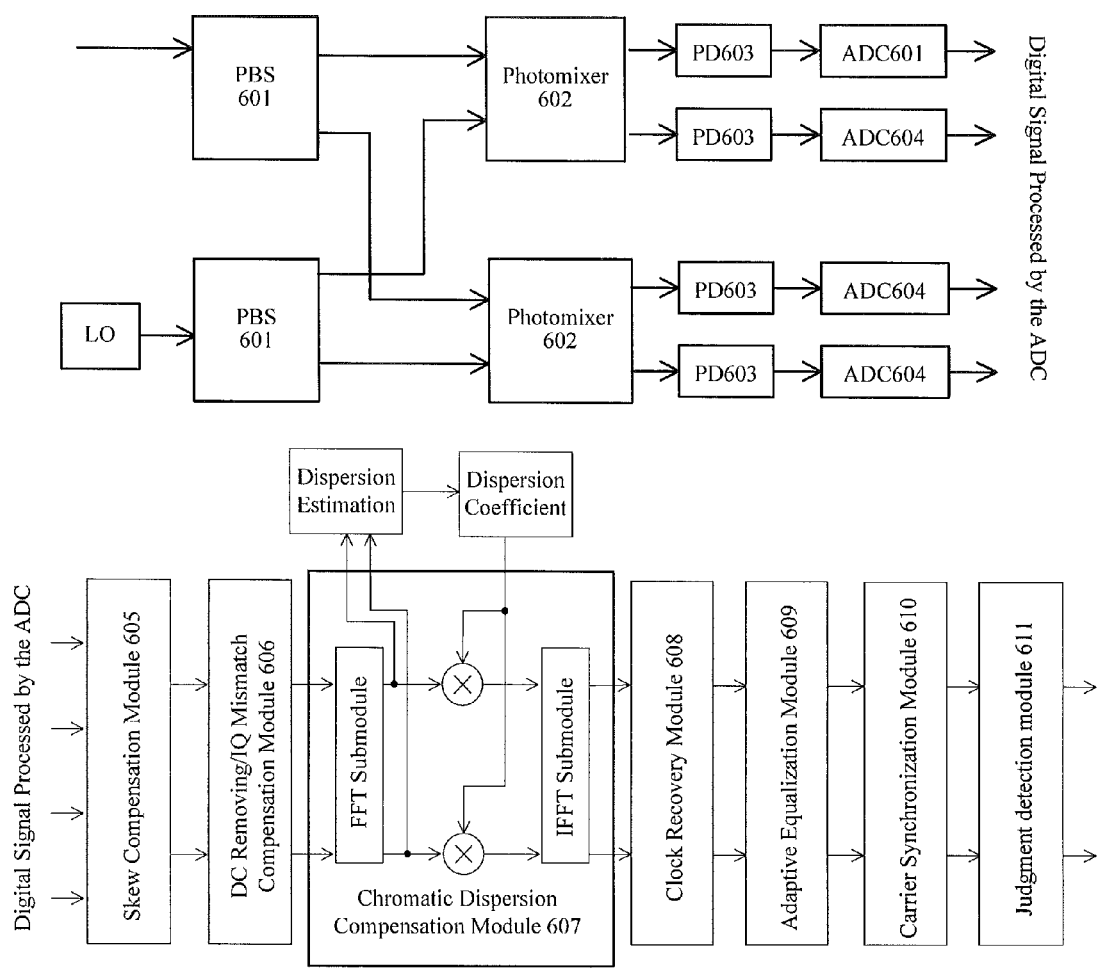
FIG. 6 is a block diagram illustrating signal process of a digital coherent receiver according to Embodiment V of the present disclosure.

FIG. 6 is a block diagram illustrating signal processing of a digital coherent receiver according to an embodiment of the present disclosure. As shown in FIG. 6, the chromatic dispersion measurement device provided by this embodiment is provided in a chromatic dispersion compensation module 607, and frequency domain data may be directly supplied by an FFT submodule in the chromatic dispersion compensation module 607 to the chromatic dispersion measurement device.

In this embodiment, the number of FFT points is 4096, and time domain data inputted by the chromatic dispersion compensation module 607 is twice of oversampling frequency. Therefore, the system symbol rate is 4096/2=2048, the wavelength of the optical signal corresponding to the frequency domain data is 1550 ns, and the sampling frequency is 4096.

Figure 7:
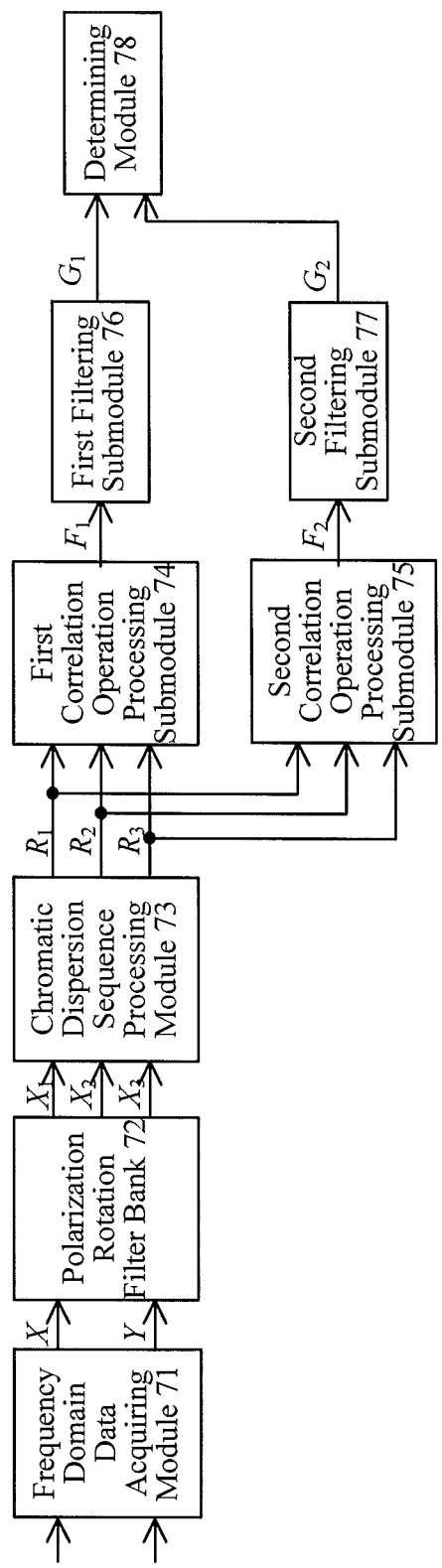
FIG. 7 is a block diagram illustrating signal process of a chromatic dispersion measurement device according to Embodiment V of the present disclosure.

FIG. 7 is a block diagram illustrating signal processing of the chromatic dispersion measurement device according to the embodiment. As shown in FIG. 7, the device includes: a frequency domain data acquiring module 71, a polarization rotation filter bank 72, a chromatic dispersion sequence processing module 73, a first correlation operation process submodule 74, a second correlation operation process submodule 75, a first filtering submodule 76, a second filtering submodule 77 and a determining module 78. A corresponding signal processing procedure may include the following steps.

Step A: the frequency domain data acquiring module 71 directly acquires frequency domain data from the FFT submodule of the chromatic dispersion compensation module, and sends the acquired frequency domain data to the polarization rotation filter bank 72.

In an embodiment, the acquired frequency domain data include first sub-frequency domain data X and second sub-frequency domain data Y, where the first sub-frequency domain data refer to frequency domain data obtained through a first optical polarization; and the second sub-frequency domain data refer to frequency domain data obtained through a second optical polarization.

Step B: the polarization rotation filter bank 72 performs polarization rotation on the frequency domain data send by the frequency domain data acquiring module 71 to generate three frequency domain data having different polarization directions, and send the generated three frequency domain data having different polarization directions to the chromatic dispersion sequence processing module 73.

In an embodiment, the generated three frequency domain data having different polarization directions may be expressed as:

$X_1[k] = \sqrt{2} \cdot X[k]$ $X_2[k] = X[k] + \sqrt{-1} \cdot Y[k]$;

$X_3[k] = X[k] + Y[k]$ $k = 0, \ldots, 4095$

Step C: the chromatic dispersion sequence processing module 73 performs chromatic dispersion sequence process on the generated three frequency domain data having different polarization directions, and respectively sends three obtained chromatic dispersion sequences to the first correlation operation process submodule 74 and the second correlation operation process submodule 75.

In an embodiment, the performing chromatic dispersion sequence process specifically includes:

multiplying a complex conjugate of an element in the frequency domain data by that of another element which is away from the previous element by a first distance, where the first distance is a system symbol rate.

The three obtained chromatic dispersion sequences ($R_1$, $R_2$ and $R_3$) may be expressed as:

$C_n[k] = X_n[k] * \mathrm{conj}(X_n[k+2048]), k=0, \ldots, 2047, n=1, 2, 3$;

Step D: the first correlation operation process submodule 74 separately performs correlation operation process with the first preset interval on the three obtained chromatic dispersion sequences, calculates a sum of obtained correlation values to obtain a first value, and send the obtained first value to the first filtering submodule 76.

In an embodiment, the correlation operation process with the first preset interval specifically includes:

separately multiplying a complex conjugate of each element in the three chromatic dispersion sequences by that of another element which is away from the previous element by the first preset interval, and calculating a sum of obtained products to obtain each correlation value.

Supposing the first preset interval is $\Delta_1$, the first value may be expressed as:

$$F_1 = \sum_{n=1}^{3} \sum_{k=0}^{2047-\Delta_1} (C_n[k] * \mathrm{conj}(C_n[k + \Delta_1]));$$

Step E: the first filtering submodule 76 performs filtering process on obtained $F_1$ to obtain a sixth value, and sends the obtained sixth value to the determining module 78.

In an embodiment, the first filtering submodule 76 is a low-pass filter.

The sixth value may be expressed as an equation as below:

$$G_1 = \sum_{i=1}^{L} F_1[i];$$

where L denotes the number of times in acquiring $F_1$; herein, the concrete value of L may be determined according to needs.

$G_1$ is a complex number.

Step F: the second correlation operation process submodule 75 separately performs correlation operation process with the second preset interval on three obtained chromatic dispersion sequences, calculates a sum of obtained correlation values to obtain another first value, and sends the obtained another first value to the second filtering submodule 77.

In an embodiment, the correlation operation process with the first preset interval specifically includes:

separately multiplying a complex conjugate of each element in the three chromatic dispersion sequences by that of another element which is away from the previous element by the first preset interval, and calculating a sum of obtained products to obtain each correlation value.

Supposing the second preset interval is $\Delta_2$, the another first value may be expressed as:

$$F_2 = \sum_{n=1}^{3} \sum_{k=0}^{2047-\Delta_2} (C_n[k] * conj(C_n[k+\Delta_2]));$$

Step G: the second filtering submodule 77 performs filtering process on obtained $F_2$ to obtain another sixth value, and sends the obtained another sixth value to the determining module 78.

In an embodiment, the second filtering submodule 77 is a low-pass filter.

The another sixth value may be expressed as an equation as below:

$$G_2 = \sum_{i=1}^{L} F_2[i];$$

where L denotes the number of times in acquiring $F_2$; herein, the concrete value of L may be determined according to needs.

$G_2$ is a complex number.

In an embodiment, steps D~E and steps F~G may be executed in any order.

Step H: after receiving two sixth values, the determining module respectively calculates the arguments of the two sixth values, and performs unwrapping process on two preset intervals and two second values.

In an embodiment, concrete implementation of this step includes following steps.

Step H1: the arguments of the two sixth values are calculated respectively:

$$\Phi_1 = \frac{\arg(G_1)}{2\pi};$$

$$\Phi_2 = \frac{\arg(G_2)}{2\pi};$$

$\Phi_1 \in [-0.5, 0.5), \Phi_2 \in [-0.5, 0.5).$

Step H2: unwrapping process in performed on $\Phi_1$ and $\Phi_2$; specifically, supposing $\Delta_1=2$, $\Delta_2=32$, then $\Delta_2/\Delta_1=16$, it is calculated:

$$\Phi'_1 = \Phi_1$$

$$\Phi'_2 = \Phi_2 + \text{round}\left[\frac{\Delta_n}{\Delta_{n-1}}\Phi'_1 - \Phi_2\right] = \Phi_2 + \text{round}[16\Phi'_1 - \Phi_2];$$

where round denotes a rounding-off operation, and $\Phi'_2$ denotes a value obtained after unwrapping.

Step H3: a chromatic dispersion value is determined.

Specifically, the chromatic dispersion value is calculated according to the equation:

$$CD = \frac{\Phi'_2}{\Delta_2} \times \frac{c}{\lambda^2 \times \frac{f_s}{nfft} \times f_d}.$$

When the wavelength corresponding to the frequency domain data, FFT points, the system symbol rate and the sampling frequency are determined, the value of $$\frac{c}{\lambda^2 \times \frac{f_s}{nfft} \times f_d}$$

is a constant. Therefore, $$\frac{c}{\lambda^2 \times \frac{f_s}{nfft} \times f_d}$$

may be referred to as a chromatic dispersion proportional relation coefficient. In this embodiment, the value of $$\frac{c}{\lambda^2 \times \frac{f_s}{nfft} \times f_d}$$

is 249567 ps/nm, where the value of c is 299792458 m/s.

Two preset intervals are adopted in this embodiment of the present disclosure for correlation operation process. Therefore, a higher chromatic dispersion estimation accuracy can be reached.

Furthermore, filtering process is performed on the first value to obtain the sixth value; and correspondingly, the chromatic dispersion value is determined according to the sixth value, the frequency value per unit frequency interval of the frequency domain data and the preset interval. In this way, the range of the chromatic dispersion value can be determined more accurately.

Based on the foregoing chromatic dispersion measurement device, this embodiment of the present disclosure further provides a digital coherent receiver, which includes a basic structure of the chromatic dispersion measurement device as shown in FIG. 4 or 5 and various modifications and equivalent substitutions and, thus, is not elaborated herein.

Those skilled in the art should realize that the embodiments of the present invention may be provided as a method, a system or a computer program product. Therefore, the invention may use forms of a hardware embodiment, a software embodiment, or an embodiment in combination of software and hardware aspects. Furthermore, the invention may use forms of computer program products implemented on one or more computer storage media (including but not limited to a magnetic disk memory, an optical memory or the like) which includes a computer program code.

The invention is described with reference to flowcharts and/or block diagrams according to the method, equipment (system) and a computer program product of the embodiments of the invention. It is to be understood that each flow and/or block in the flowchart and/or block diagram as well as combination of flow and/or block in the flowchart and/or block diagram may be realized by computer program instructions. These computer program instructions may be provided to a general purpose computer, a special purpose computer, an embedded processor or processors of other programmable data process equipment so as to generate a machine so that such a device configured to achieve functions designated in one or more flows of the flowchart and/or in one or more blocks of the block diagram is generated by means of instructions executed by computers or processors of other programmable data process equipment.

These computer program instructions may be stored in a computer-readable memory which can instruct a computer or other programmable data process equipment to work in a particular way so that instructions stored in the computer-readable memory may generate a manufactured product comprising a command device which can achieve functions designated in one or more flows of the flowchart and/or in one or more blocks of the block diagram.

These computer program instructions may also be loaded onto computers or other programmable data process equipment so that a series of operation steps are executed on the computers or other programmable equipment to generate a process achieved by computers, thus providing steps for achieving functions designated in one or more flows of the flowchart and/or in one or more blocks of the block diagram by means of instructions executed by computers or other programmable equipment.

The abovementioned embodiments are merely preferred embodiments of the present invention, and are not intended to limit the scope of protection of the present invention.

What is claimed is:

1. A chromatic dispersion measurement method, comprising:
   performing chromatic dispersion sequence process on acquired frequency domain data to obtain chromatic dispersion sequences of the frequency domain data;
   performing correlation operation process with a preset interval on the obtained chromatic dispersion sequences, respectively, and calculating a sum of obtained correlation values to obtain a first value; and
   determining a chromatic dispersion value according to the first value, a frequency value per unit frequency interval of the frequency domain data, and the preset interval;
   wherein the determining the chromatic dispersion value according to the first value, a frequency value per unit frequency interval of the frequency domain data and the preset interval comprises:
   calculating an argument of the first value to obtain a second value;
   dividing the second value by the preset interval to obtain a third value;
   multiplying a square of a wavelength of an optical signal corresponding to the frequency domain data by the frequency value per unit frequency interval of the frequency domain data and the system symbol rate to obtain a fourth value;
   dividing velocity of light by the fourth value to obtain a fifth value; and
   multiplying the third value by the fifth value to obtain the chromatic dispersion value.

2. The method according to claim 1, wherein the performing the chromatic dispersion sequence process comprises:
   multiplying a complex conjugate of an element in the frequency domain data by a complex conjugate of another element being away from the element by a first distance, wherein the first distance is a system symbol rate.

3. The method according to claim 1, wherein the performing the correlation operation process with the preset interval on the obtained chromatic dispersion sequences of the frequency domain data comprises:
   multiplying a complex conjugate of an element in the chromatic dispersion sequences by a complex conjugate of another element being away from the element by the preset interval, and calculating a sum of obtained products to obtain a correlation value.

4. The method according to claim 1, wherein when there are two or more preset intervals, the two or more preset intervals have different values and, correspondingly, two or more first values are obtained; and
   when the third value is obtained, the method further comprises: performing unwrapping process on the two or more preset intervals and the two or more corresponding second values to obtain the third value.

5. The method according to claim 1, wherein before the determining the chromatic dispersion value according to the first value, the frequency value per unit frequency interval of the frequency domain data and the preset interval, the method further comprises:
   performing filtering process on the first value to obtain a sixth value; and
   correspondingly, determining the chromatic dispersion value according to the sixth value, the frequency value per unit frequency interval of the frequency domain data, and the preset interval.

6. The method according to claim 5, wherein the determining the chromatic dispersion value according to the sixth value, the frequency value per unit frequency interval of the frequency domain data and the preset interval comprises:
   calculating an argument of the sixth value to obtain a second value;
   dividing the second value by the preset interval to obtain a third value;
   multiplying a square of wavelength of an optical signal corresponding to the frequency domain data by the frequency value per unit frequency interval of the frequency domain data and a system symbol rate to obtain a fourth value;
   dividing velocity of light by the fourth value to obtain a fifth value; and
   multiplying the third value by the fifth value to obtain the chromatic dispersion value.

7. The method according to claim 6, wherein when there are two or more preset intervals, the two or more preset intervals have different values and, correspondingly, two or more first values, two or more sixth values and two or more second values are obtained; and when the third value is obtained, the method further comprises: performing unwrapping process on the two or more preset intervals and two or more corresponding second values to obtain the third value.

8. The method according to claim 1, wherein before the performing chromatic dispersion sequence process on acquired frequency domain data, the method further comprises:

performing polarization rotation on the frequency domain data to generate multiple frequency domain data having different polarization directions; and correspondingly, performing chromatic dispersion sequence process on the generated multiple frequency domain data having different polarization directions.

9. The method according to claim 8, wherein before the performing polarization rotation on the frequency domain data, the method further comprises:

acquiring the frequency domain data.

10. A chromatic dispersion measurement device, comprising:

a processor; and a memory configured to store instructions executable by the processor;

wherein the processor is configured to, upon executing the instructions:

perform chromatic dispersion sequence process on acquired frequency domain data to obtain chromatic dispersion sequences of the frequency domain data;

perform correlation operation process with a preset interval on the obtained chromatic dispersion sequences, respectively, and calculating a sum of obtained correlation values to obtain a first value; and determine a chromatic dispersion value according to the first value, a frequency value per unit frequency interval of the frequency domain data, and the preset interval;

wherein in determination of the chromatic dispersion value, the processor is configured to:

calculate an argument of the first value to obtain a second value;

divide the second value by the preset interval to obtain a third value;

multiply a square of a wavelength of an optical signal corresponding to the frequency domain data by the frequency value per unit frequency interval of the frequency domain data and the system symbol rate to obtain a fourth value;

divide velocity of light by the fourth value to obtain a fifth value; and multiply the third value by the fifth value to obtain the chromatic dispersion value.

11. The device according to claim 10, wherein in the chromatic dispersion sequence process, the processor is configured to:

multiply a complex conjugate of an element in the frequency domain data by a complex conjugate of another element being away from the element by a first distance, wherein the first distance is a system symbol rate.

12. The device according to claim 10, wherein in the correlation operation process, the processor is configured to:

multiply a complex conjugate of an element in the chromatic dispersion sequences by a complex conjugate of another element being away from the element by the preset interval, and calculating a sum of obtained products to obtain a correlation value.

13. The device according to claim 10, wherein when there are two or more preset intervals, the two or more preset intervals have different values and, correspondingly, two or more first values are obtained; and when the third value is obtained, the processor is configured to: perform unwrapping process on the two or more preset intervals and the two or more corresponding second values to obtain the third value.

14. The device according to claim 12, wherein before determination of the chromatic dispersion value, the processor is configured to:

perform filtering process on the first value to obtain a sixth value; and correspondingly, determine the chromatic dispersion value according to the sixth value, the frequency value per unit frequency interval of the frequency domain data, and the preset interval.

15. The device according to claim 14, wherein in determination of the chromatic dispersion value, the processor is configured to:

calculate an argument of the sixth value to obtain a second value;

divide the second value by the preset interval to obtain a third value;

multiply a square of wavelength of an optical signal corresponding to the frequency domain data by the frequency value per unit frequency interval of the frequency domain data and a system symbol rate to obtain a fourth value;

divide velocity of light by the fourth value to obtain a fifth value; and multiply the third value by the fifth value to obtain the chromatic dispersion value.

16. The device according to claim 15, wherein when there are two or more preset intervals, the two or more preset intervals have different values and, correspondingly, two or more first values, two or more sixth values and two or more second values are obtained; and when the third value is obtained, the processor is configured to: performing unwrapping process on the two or more preset intervals and two or more corresponding second values to obtain the third value.

17. The device according to claim 10, wherein before the chromatic dispersion sequence process, the processor is configured to:

perform polarization rotation on the frequency domain data to generate multiple frequency domain data having different polarization directions; and correspondingly, perform chromatic dispersion sequence process on the generated multiple frequency domain data having different polarization directions.

18. A non-transitory computer-readable storage medium having stored therein instructions that, when executed by a processor of a digital coherent receiver, causes the digital coherent receiver to perform a chromatic dispersion measurement method, the method comprising:

performing chromatic dispersion sequence process on acquired frequency domain data to obtain chromatic dispersion sequences of the frequency domain data;

performing correlation operation process with a preset interval on the obtained chromatic dispersion sequences, respectively, and calculating a sum of obtained correlation values to obtain a first value; and determining a chromatic dispersion value according to the first value, a frequency value per unit frequency interval of the frequency domain data, and the preset interval;

wherein the determining the chromatic dispersion value according to the first value, a frequency value per unit frequency interval of the frequency domain data and the preset interval comprises:

calculating an argument of the first value to obtain a second value;

dividing the second value by the preset interval to obtain a third value;

multiplying a square of a wavelength of an optical signal corresponding to the frequency domain data by the frequency value per unit frequency interval of the frequency domain data and the system symbol rate to obtain a fourth value;

dividing velocity of light by the fourth value to obtain a fifth value; and multiplying the third value by the fifth value to obtain the chromatic dispersion value.

* * * * *